M. SCHEY.
SPIT.
APPLICATION FILED JUNE 6, 1919.

1,359,749.

Patented Nov. 23, 1920.

INVENTOR
Max Schey.
BY
Jas. H. Griffin
ATTORNEY

UNITED STATES PATENT OFFICE.

MAX SCHEY, OF BROOKLYN, NEW YORK.

SPIT.

1,359,749.  Specification of Letters Patent.  Patented Nov. 23, 1920.

Application filed June 6, 1919. Serial No. 302,142.

*To all whom it may concern:*

Be it known that I, MAX SCHEY, a citizen of the United States, residing in the city of New York, borough of Brooklyn, county of Kings, and State of New York, have invented a certain new and useful Spit, of which the following is a specification.

This invention is a spit adapted to be mounted in relatively close proximity to a source of heat for the purpose of carrying out the functions of a broiler.

Spits have long been used but, as constructed, are so formed that in carrying out their functions of supporting the meat for broiling, such meat is impaled by the spit and is held in such impaled condition in proximity to the fire. While this mode of supporting the meat is quite satisfactory with certain sorts of meats it is entirely impractical to impale a stuffed fowl and other stuffed meats as the dressing or stuffing contained within the bird invariably works out through the holes formed by impaling it on the spit. Accordingly, it has long been desirable to provide means for supporting a stuffed fowl on a spit without necessitating the impaling of the bird.

Several years ago a spit was placed on the market the structure of which was such that a bird could be supported without necessitating the impaling of it but the structure of this spit was such that only birds of a predetermined size could be supported thereby as said spit did not embody means for adapting it to support birds of various sizes but was of a rigid nonflexible construction. Accordingly, for a person to employ such a spit for roasting birds of different sizes it was necessary to have a relatively large assortment of sizes of spits, some of which were seldom used. As a result the spit in question never came into extensive use.

With the foregoing considerations in mind the object of the present invention is to provide a spit which will support a fowl or any other form of meat without the necessity of impaling it and which is so constituted that it is adapted to support birds of widely varying sizes and shapes. The result of such construction is that one spit may be employed in the broiling of almost any sort of meat or stuffed fowl and the carrying of a large number of sizes of spits on hand is obviated.

Features of the invention, other than those specified will be apparent from the hereinafter detailed description taken in conjunction with the accompanying drawings.

In the accompanying drawings I have illustrated one practical embodiment of the invention, but the construction therein shown is to be understood as illustrative only, and not as defining the limits of the invention.

Figure 1:
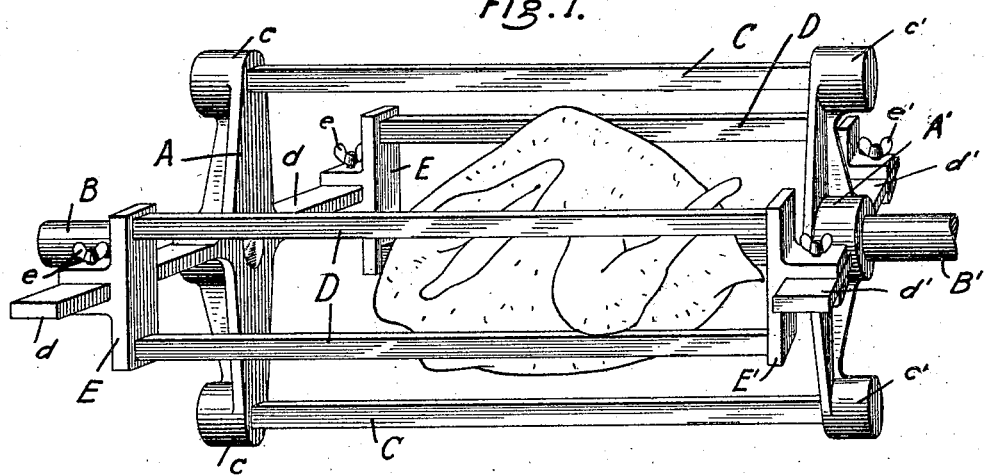
Figure 1 is a perspective view of a spit embodying the present invention, said view illustrating the manner in which a stuffed bird is supported by the spit without the necessity of impaling the same.
Figure 2:
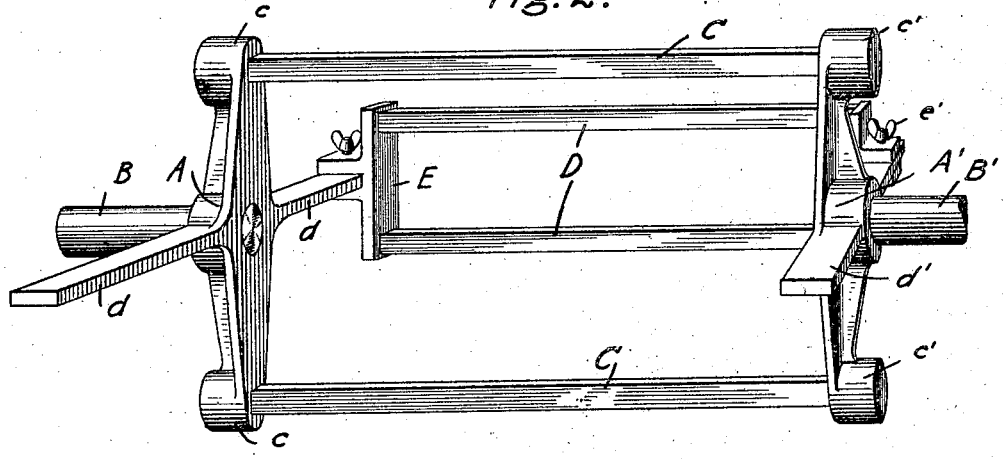
Fig. 2 is a view similar to Fig. 1 but showing the bird removed and the portion of the spit dismantled to allow of such removal of the fowl.
Figure 3:
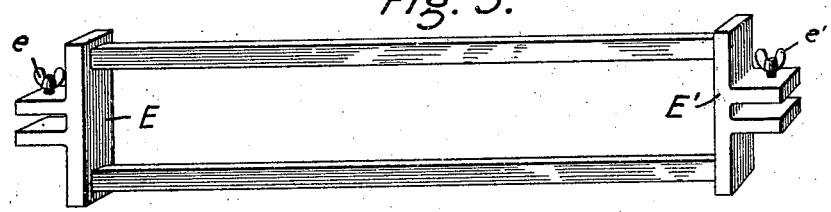
Fig. 3 is a perspective view of an adjustable element of the construction.

Referring to the drawings A and A' designate the two terminal members or supporting elements of a spit, each of which members is provided with a stub shaft B and B' respectively, by virtue of which the members may be mounted for rotation in close proximity to the fire. In practice a gear or pinion is usually associated with one or both of these stub shafts and serves to impart such rotation thereto. Members A and A' may be of various shapes but are here shown in the form of spiders provided with arms extending radially of the axis of rotation of the spit and substantially 90 degrees to one another. The spider A has two oppositely extending arms $c$ and two other oppositely extending arms $d$ while the spider A' has corresponding arms $c'$ and $d'$. The spiders A and A' are maintained in spaced relation and are adapted for rigid coöperation with one another by means of a pair of rods C which connect the outer ends of the arms $c$ and $c'$ as shown and these rods are rigidly secured to the respective arms of the spiders for the purpose of rendering the whole construction thus far described rigid and, in effect, homogeneous.

The rods C, moreover, form two opposite sides of the spit while the other two opposite sides of the spit are formed by rods D which are arranged in pairs. Each pair of rods D is secured at its opposite ends to brackets E and E' which are adapted to be normally mounted for sliding movement on the arms $d$ and $d'$ respectively of the spiders but may be locked in any desired adjustment thereon by screws $e$ and $e'$.

When the said screws are loosened the brackets E and E' with the rods D which they support and carry may be adjusted longitudinally of the arms $d$ and $d'$ for the purpose of varying the distance between the oppositely positioned rods in order to compensate for fowl of various sizes adapted to be positioned between them. In practice the rods C are positioned at such distances from the axis of rotation of the spit that a fowl of relatively large size may be positioned between these rods but if a smaller fowl is mounted on the spit the rods D are brought together through the sliding of the brackets E and E' toward one another and said screws tightened to tightly clamp the parts against retrograde movement and firmly hold the fowl in position. In all cases, however, the rods C will adequately preclude the fowl from falling out of the opposite sides of the spit while the rods D will make it impossible for the fowl to fall from the other two opposite sides.

The positioning of a relatively large bird within the confines of the spit may necessitate the removal of two of the rods D during the insertion of the bird after which the rods D are returned to position and the brackets clamped in place. However, on smaller birds it is not necessary to dismantle the rods D but simply move two of them to the outer end of the arms $d$ and $d'$ whereupon the bird may be introduced between two adjacent rods D and C and the rods D thereafter returned to position to grip the bird. The advantages of the spit of the character described will be manifest to those skilled in the art, it being apparent that birds of a wide variety of sizes may be supported on the spit without necessitating the impaling of the bird to support it in a rigid, positive manner.

Having thus fully described my invention, what I claim as new and desire to secure by Letters Patent is:

1. A spit embodying a pair of castings, each of which is in the form of a spider having a plurality of radially extending arms, a trunnion on each spider, a plurality of rods connecting certain corresponding arms of said spiders spacing them apart, a bracket slidably mounted on each of the other arms, a plurality of rods connecting each two corresponding brackets of said spiders, all of said rods collectively forming a cage for housing a stuffed fowl, the confines of which cage may be varied in accordance with the size of the fowl through the movement of the brackets, and means for locking the brackets in predetermined positions to prevent the inadvertent release of the bird.

2. A spit embodying a pair of supporting members, each of which is provided with a trunnion, a plurality of rods extending from one supporting member to the other for rigidly spacing them apart, a pair of brackets mounted for radial adjustment on each supporting member, and a plurality of rods connecting each two corresponding brackets of the two supporting members, all of said rods collectively forming a cage for housing a stuffed fowl, the confines of which cage may be varied in accordance with the size of the fowl through movement of the adjustable brackets.

3. A spit embodying a pair of supporting members in the form of spiders having radial extending arms and provided with trunnions, a plurality of rods extending between the spiders and rigidly secured to certain of the arms thereof for rigidly spacing the spiders apart, a bracket mounted for sliding movement longitudinally of each of the other arms of each spider, and additional rods extending between corresponding brackets of the spiders, all of said rods collectively forming a cage for housing a stuffed fowl, the confines of which cage may be varied in accordance with the size of the fowl through adjustment of the sliding brackets on the arms of the spiders, and means associated with each bracket for locking it against movement on the arm which forms its support.

4. A spit embodying a pair of supporting members, each of which is provided with a trunnion, a plurality of rods extending from one supporting member to the other and rigid therewith for spacing the supporting members apart, and a plurality of additional rods extending from one supporting member to the other and adjustably mounted at their opposite ends to the respective supporting members for radial adjustment relative to the axis of the trunnions of the supporting members, all of said rods collectively forming a cage for housing a stuffed fowl, the confines of which cage may be varied in accordance with the size of the fowl through movement of the adjustable rods.

In testimony whereof, I sign my name to this specification.

MAX SCHEY.